Fig. I.

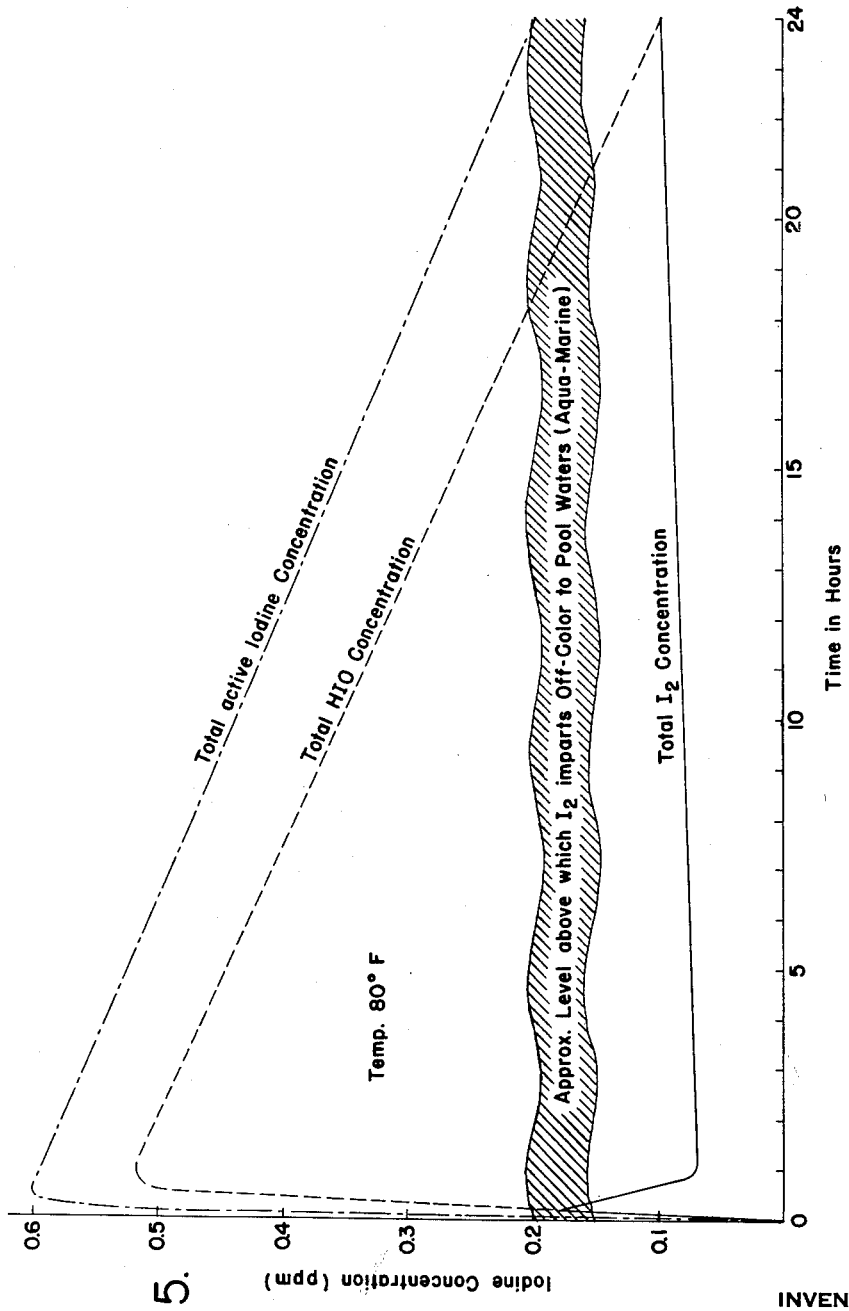

United States Patent Office 3,136,716
Patented June 9, 1964

3,136,716
PROCESS FOR PURIFYING AQUEOUS MEDIA
Volda Kitter, Tuckahoe, N.Y., assignor to Voldale, Inc., Long Island City, N.Y., a corporation of New York
Filed Dec. 26, 1962, Ser. No. 246,923
11 Claims. (Cl. 210—62)

This invention relates, in general, to a novel process for purifying aqueous media such as swimming pool waters and the like. More particularly, the invention contemplates the provision of a unique process of the general class described in which hypoiodous acid (HIO) is utilized as a combined germicide and algaecide to effect purification of aqueous media against buildup of bacteria, including vegetative bacteria, with complete avoidance of the undesirable side-effects and control measures encountered with use of known purification techniques including, for example, chlorination and conventional iodination practices.

Heretofore, chlorination has become the most common method of purification employed in the treatment of swimming pool waters. While most measures of this general type are effective for the purpose intended, the disadvantages attendant to such practice are legion. For example, chlorine-containing sanitizing agents produce irritation of the eyes and mucous membranes; they result in bleaching of swim suit fabrics and hair; they are extremely sensitive to bather load; they are affected by both water hardness and ammonia present in the water or liberated by bathers; some of the more common chlorine-containing additives liberate chemicals which affect the pH value of the water necessitating the frequent addition of base- and acid-adjusting chemicals; and they generally affect, adversely, the appearance and clarity of water.

More recently, attention has been directed toward procedures involving the iodine-disinfection of swimming pool waters, or combined procedures in which both chlorine and iodine are utilized in combination for sterilization purposes. Known compositions of this type require the presence within the water of substantial quantities of chlorine and are, therefore, subject to virtually the same disadvantages as the chlorination compositions, per se. In addition, in the adaptation of these known mechanisms to the problem of swimming pool disinfection, little or no recognition has been given to the various possible forms of iodine present in the water, and, accordingly, full advantage of the bactericidal and optical properties of iodine has not been realized.

Thus, of the six forms of iodine that can be found in aqueous media, namely, iodide ($I^-$), diatomic iodine ($I_2$), hypoiodous acid (HIO), hypoiodite ($OI^-$), triiodide ($I_3^-$) and iodate ($IO_3^-$), it has been generally thought that only the diatomic form possesses germicidal activity of any significance. It is conceded that the triiodide is of negligible activity and the iodate is without any activity at all. The latter form of this halogen functions, furthermore, to permanently remove iodine from the system. The triiodide, while it does not function in the latter respect and does exhibit limited germicidal activity, is to be avoided because of its strong yellow color which conflicts sharply with the sought-after natural sky-blue color for swimming pool waters, resulting in dirty-appearing shades of green and olive. On the other hand, the very desirable bactericidal properties of diatomic iodine are offset, at least in part, by the fact that it too possesses color, namely, amber, and though its intensity of coloration is of a lower order as compared with the triiodide, concentrations greater than 0.2 part per million will destroy the sought-after blue, yielding, in its place, shades of green and aquamarine.

Contrary to the generally accepted opinion that the hypoiodous acid form of iodine is not an effective bactericidal agent, my investigations demonstrate that it is quite antimicrobial in action, exhibiting, by way of comparison, approximately twice the activity of diatomic iodine against vegetative forms of bacteria while, at the same time, possessing remarkable and hitherto unsuspected algaecidal activity. In addition, hypoiodous acid, in use dilution, is completely colorless, and concentrations of the compound of the order of one part per million or higher leave swimming pool waters their desirable natural blue.

While the foregoing properties obviously render hypoiodous acid the preferred form of the halogen for purposes of disinfecting swimming pools and the like, it appears that little or no attention has been directed towards such an application by reason of the known instability of the compound in aqueous solutions. Thus, hypoiodous acid is actually present in an aqueous solution of iodine due to a hydrolysis mechanism, viz.

(1) $\quad I_2 + H_2O \rightleftharpoons HIO + H^+ + I^-$

The compound then undergoes decomposition, as a function of time, yielding approximately equivalent concentrations of iodate and diatomic iodine as represented by the equation:

(2) $\quad 3HIO = I_2 + IO_3^-$

It has been postulated heretofore that the foregoing decomposition rate is so rapid as to render impossible the maintenance of any effective residual of hypoiodous acid within an aqueous system. For example, in a system of pH 6.3 at 25° C., an initial concentration of 52 parts per million of hypoiodous acid is decomposed to the extent of ninety percent (90%) within approximately seven (7) minutes, whereas at lower concentrations of the order of 14 parts per million approximately seventy percent (70%) of the compound is decomposed within the same time interval. In general, therefore, the average half-life of the compound at these concentrations is about two minutes, whereas effective swimming pool disinfection requires the maintenance of sustained activity for periods of at least twenty-four (24) hours, and preferably longer.

In addition to the aforementioned pronounced antimicrobial and algaecidal activities demonstrated for hypoiodous acid, my investigations have further demonstrated that the rate of the foregoing decomposition mechanism reaches a sharply reduced level, under certain conditions, at concentrations of the hypoiodous acid which are more than adequate to maintain swimming pool waters at drinking purity for periods in excess of twenty-four (24) hours.

It is a principal object of my invention to provide a swimming pool disinfection technique which is capable, through the interaction of metallic iodides and chemically active chlorine, of maintaining purifying concentrations of hypoiodous acid within such waters for effective sustained periods of time.

Various other objects and advantages will appear from the following description of an embodiment of the invention, and the novel features will be particularly pointed out in connection with the appended claims.

The unique purifying mechanism of my invention provides a quick-acting antimicrobial agent capable of effecting complete swimming pool water disinfection, and which, in use-dilutions is non-toxic, does not irritate the eyes or mucous membranes, does not bleach or otherwise affect swim suit fabrics or hair, is virtually unaffected by bather load, is capable of controlling the growth of algae, is not affected by water hardness or ammonia, is non-staining, non-scale forming and does not alter the pH of the water, substantially reduces the need for soda ash as well as acid for pH adjustment, and which is relatively inexpensive, stable in storage and easy to handle in treatment.

The foregoing as well as other features and objects of my invention will be best understood by reference to the following description of specific embodiments of the invention taken in conjunction with the accompanying drawings wherein:

FIG. 5 is a graph containing a combined plot illustrating the concurrent presence and relationship of hypoiodous acid and diatomic iodine within a disinfecting system of the invention.

Figure 1:
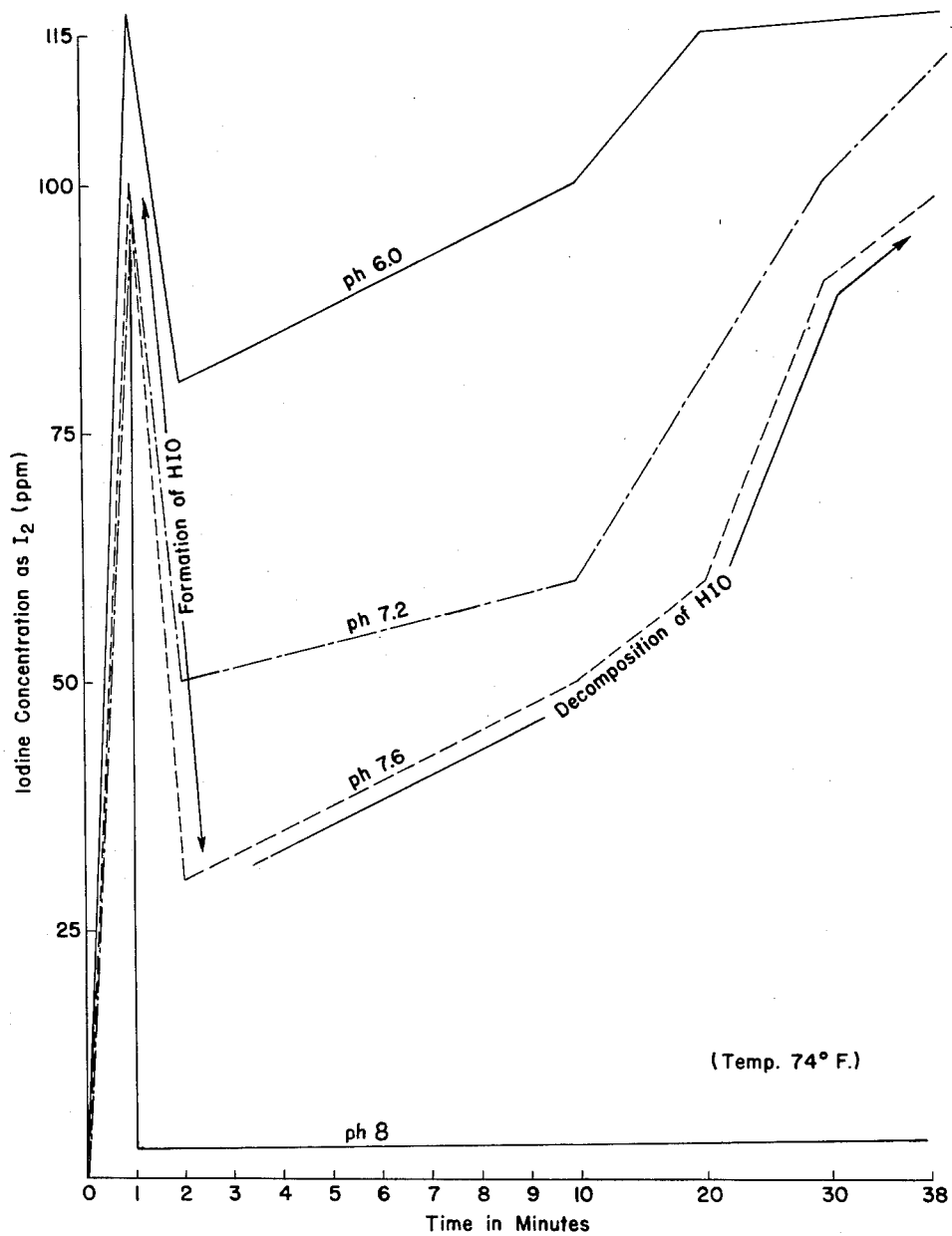
FIGS. 1, 2 and 3 are graphs illustrating plots of iodine concentration vs. time under various conditions.

In essence, the process of the invention consists of adding to a swimming pool undergoing treatment an inert, readily water-soluble iodide such as those of the alkali metals, including potassium and sodium iodide, or alkaline earth and other metallic iodides of suitable solubility, such as lithium iodide, or even organic hydroiodides, as exemplified by glycine hydroiodide, followed by the controlled addition at fixed intervals and in closely controlled molar ratios with respect to the iodide concentration, of active chlorine-containing agents capable of reacting with the iodide to liberate diatomic iodine and, in turn, with a portion of the diatomic iodine to convert the same into hypoiodous acid. The chlorine-containing "triggering agents" utilized in the purification mechanism of the invention can include, by way of illustration, dichlorodimethyl hydantoin, sodium dichloroisocyanurate, chloramine-T, trichloromelamine, dichloroisocyanuric acid, trichloroisocyanuric acid, chloramine-B, calcium hypochlorite, sodium hypochlorite, or even chlorine gas. In actual practice, I have found that the compound, 1,3-dichloro-5,5-dimethylhydantoin (Halane, trademark), as represented by the formula—

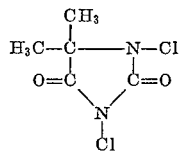

is a most effective chlorine-donor for use in the process of the invention, for the reason that it contains two chlorine substituents, one of which is relatively fast-hydrolyzing upon addition to the aqueous iodide solutions, whereas the second is somewhat slower hydrolyzing in the overall reaction mechanism, thereby providing a sustained-release type of mechanism.

In operation of the invention it is desired to generate HIO with minimum production of the inert type of iodine, i.e. iodate, which would be formed under certain conditions by certain types of chlorine atoms. A novel feature of my invention is the use of two or more mono-n-chloro compounds or a single compound containing two or more chlorine atoms on a single organic substance, or a combination of mono-n-chloro and poly-n-chloro compounds so that, in effect, there is present in the system two or more types of chlorine atoms where one type of chlorine atom has a rate of hydrolysis appreciably faster than the other and where only one type of chlorine atom has the property of raising iodide or iodine to the $+1$ state. The other atom, because of its lower hydrolysis constant (or slower rate of hydrolysis) can only bring iodide, i.e. iodine, in the $-1$ state, to $I_2$, i.e. the 0 state.

If compositions of these two types of chlorine atoms are used in conjunction with an iodide-bearing substance it is possible, by adjusting the ratio of high and low hydrolysis constant chlorine atoms and iodide and pH, to yield hypoiodous acid in stable form which can be regenerated by the careful addition of N-chloro compounds when the hypoiodous acid is spent in its germicidal action. An example of an organic substance that contains two chlorine atoms is the hydantoin compound mentioned hereinabove. By the proper adjustment of ratios of chlorine and iodide-bearing substances so that the highly hydrolyzing chlorine atom will stoichiometrically convert the initial iodide to HIO via the reaction $Cl^{+1}+I^-=Cl^{-1}+I^{+1}$, an equivalent amount of chlorine will still be attached to the organic substance which can convert any spent HIO, i.e. iodide, to $I_2$. As pointed out hereinbelow, at proper pH levels this $I_2$ will substantially hydrolyze to HIO. It may be said that the low hydrolyzing chlorine atom acts as a safeguard to keep spent HIO iodide in the germicidal state. One may at this point add a given amount of the original N-chloro substance or any other highly hydrolyzing N-chloro compound to the solution to regenerate HIO.

Figure 2:
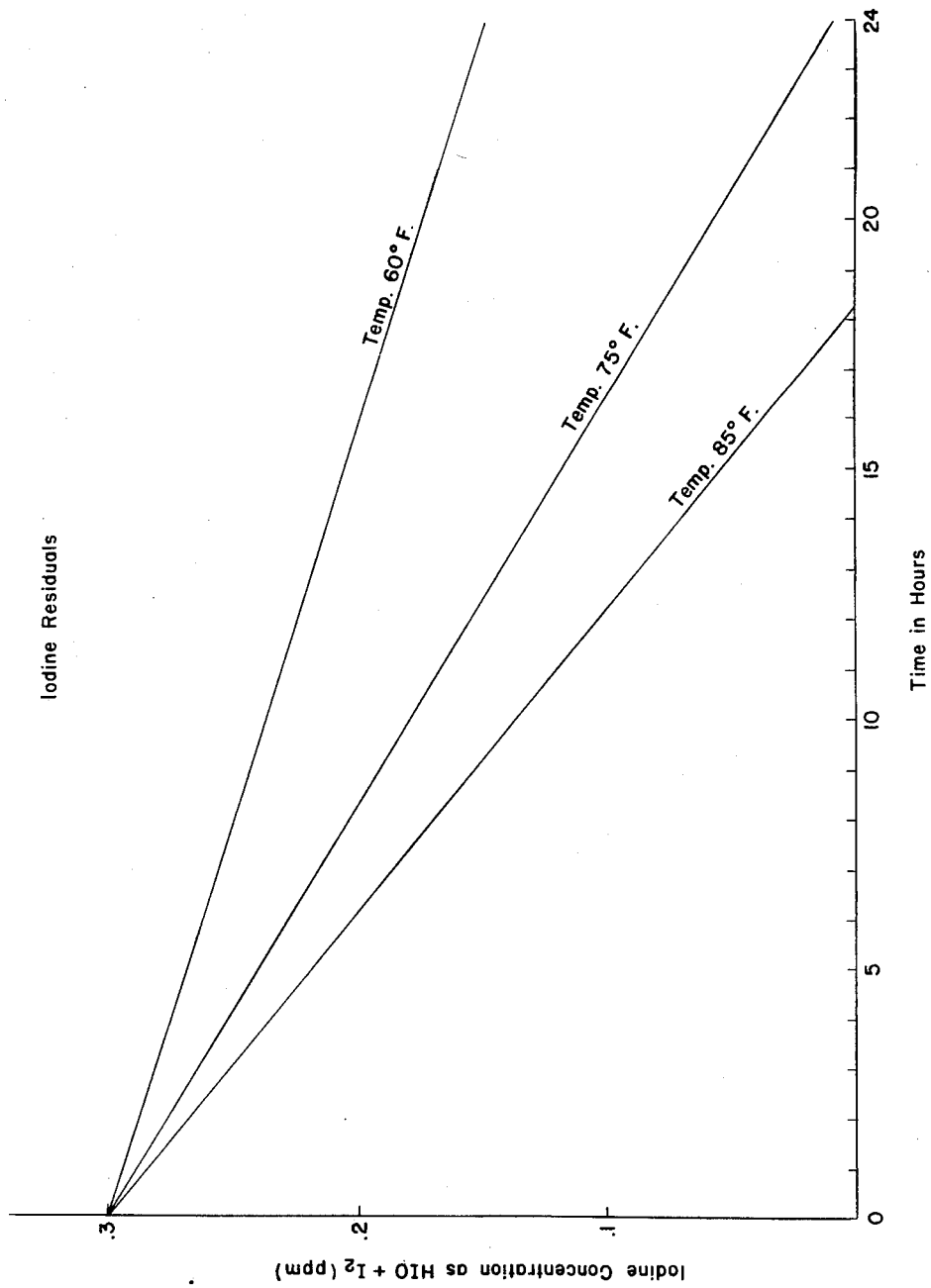
Figure 3:
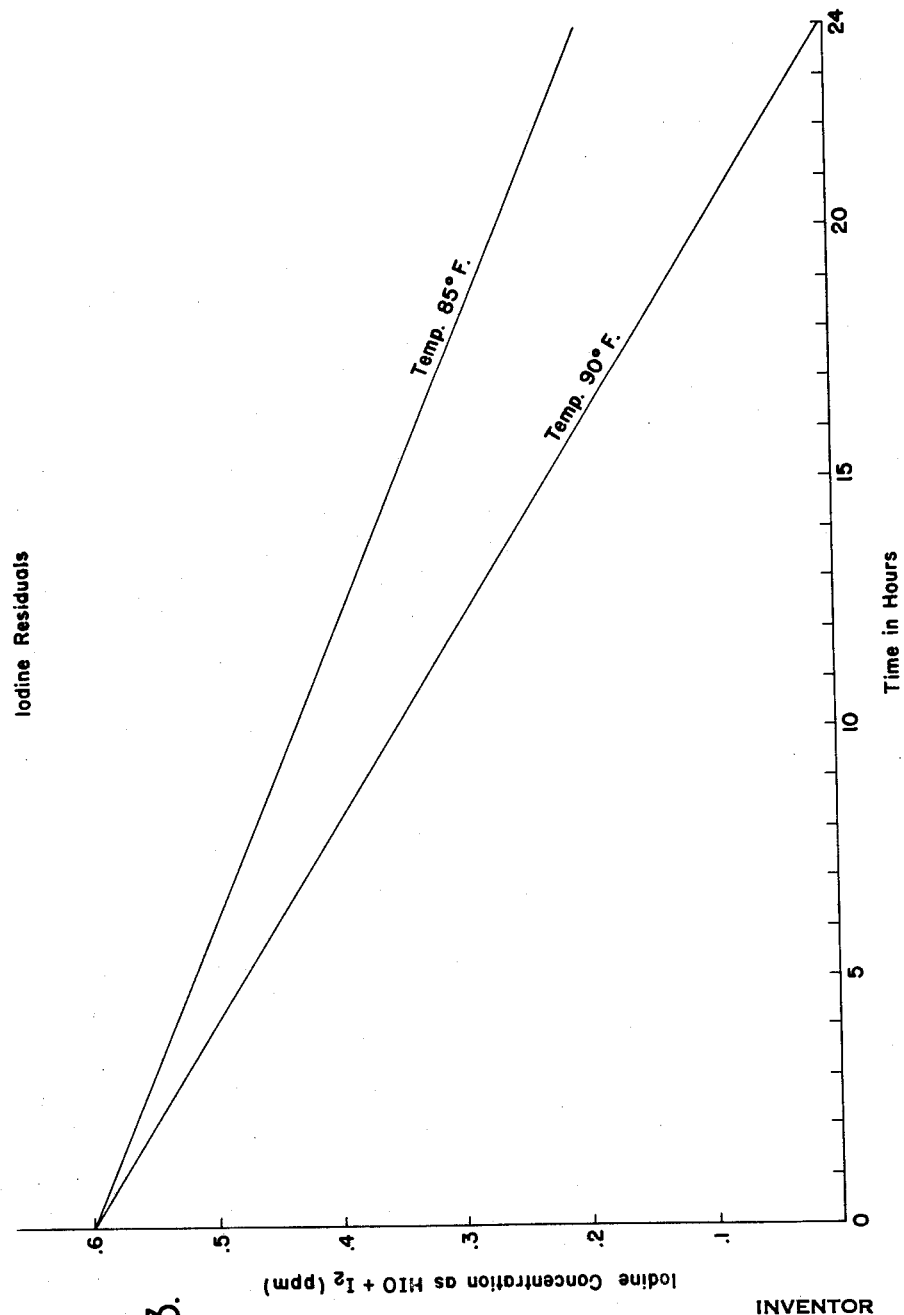

To illustrate the control factors which are essential to the successful practice of the invention, reference should be had to FIG. 1 of the drawings which illustrates, in conjunction with FIGS. 2 and 3, the chemical dynamics that occur when solutions of potassium iodide, for example, are mixed with the aforementioned preferred chlorine-donor of the invention, dichlorodimethyl hydantoin. The series of reactions which occur are largely a function of concentration, with the overall cycle proceeding even more slowly with increasing dilution. Thus, at concentrations of the order of fractional parts per million the cycle will extend over twenty-four (24) hours, while at concentrations of the order of 200 parts per million it is complete in less than one hour.

The electronic notations used herein have the following meanings, which have been adopted for convenience and ease in explaining the reaction mechanisms of the invention. The expression "$I^{+1}$" is intended to mean hypoiodous acid, HIO, i.e. iodine raised to its most bactericidally active form. The expression "$Cl^{+1}$" is intended to mean the most active form of chlorine, i.e. hypochlorous acid, HOCl. The expression "$I^-$" is, of course, the iodide, and is bacteriologically inactive, and the expression "$Cl^{-1}$" is the hypochlorite ion, which is also bacteriologically inactive. Those skilled in the art will realize that, for purposes of explaining the invention and because, in practice, the dilute solutions of the invention are substantially completely ionized, this particular notation most clearly characterizes the actual mechanisms involved.

FIG. 1 illustrates the plot of reactions in a closed system at a concentration of 185 parts per million of iodine. Thus, 250 milligrams of potassium iodide were added to one liter of distilled water containing 250 milligrams of dichlorodimethyl hydantoin (65 percent available chlorine), thereby setting the molar ratio of available chlorine to iodide at 3.0 to 1.0. This ratio allows an excess of chlorine above that necessary for hypoiodous acid production for, as the HIO in the presence of organic matter decomposes into iodide (and some iodate), this reserve chlorine will regenerate active iodine as explained hereinafter. At the completion of the cycle, all of the available chlorine will have been used up in the production and maintenance of a maximum concentration of active iodine. For example, a molar ratio of 1.0 to 1.0 would be sufficient only to react stoichiometrically with the initial iodide, while a ratio of 6.0 to 1.0 will react stoichiometrically to yield inert iodates. A ratio of 2.0 to 1.0 will react stoichiometrically to yield hypoiodous acid, but it would leave no chlorine for the aforementioned regeneration of iodine. Ideally then, the desired molar ratos are between 2 to 1 and 6 to 1 with the optimum results being obtainable at 3 to 1. A lower ratio will result in an off-color pool, whereas a highter ratio will give a greater iodine loss through conversion to iodate.

With reference to the graph of FIG. 1, it will be seen that upon mixing the two reactants within the aqueous system, there results an immediate rise in the concentration of diatomic iodine which reaches its peak at 100 parts per million within approximately two (2) minutes by the reaction mechanism:

(3) $\quad Cl^+ + 2I^- = I_2 + Cl^-$ thereafter, the diatomic iodine level falls rapidly as the hypoiodous acid production mounts, viz.:

(4) $\quad Cl^+ + I_2 = 2HIO + Cl^-$

Within two to three minutes, the diatomic iodine level drops from 100 to 30 parts per million (in the pH 7.6 system). It is apparent that the more acid system results in a lower yield of HIO and, thus, the rise and fall of the $I_2$ curve is less pronounced under these conditions. It can be seen, therefore, that the preferred range for maximum generation of HIO is from about pH 7.2 to 8.2.

The hypoiodous acid thus formed then proceeds to decompose, producing, in the presence of organic matter, iodide and iodate as represented by the equation:

(5) $\quad 3HIO = 2I^- + IO_3^-$

The residual chlorine then reacts with the new iodide to regenerate diatomic iodine, as per the mechanism:

(6) $\quad Cl^+ + 2I^- = I_2 + Cl^-$

As the HIO decomposes, therefore, it will be seen that the diatomic iodine curve will once again rise and eventually reach its peak of 100 parts per million.

When a pH close to 8 is maintained, however, the normal hydrolysis of $I_2$ will convert over 80% of this $I_2$ to HIO, provided the total $I_2$ concentration is approximately 1 part per million or less, as will be explained more fully hereinafter.

Figure 4:
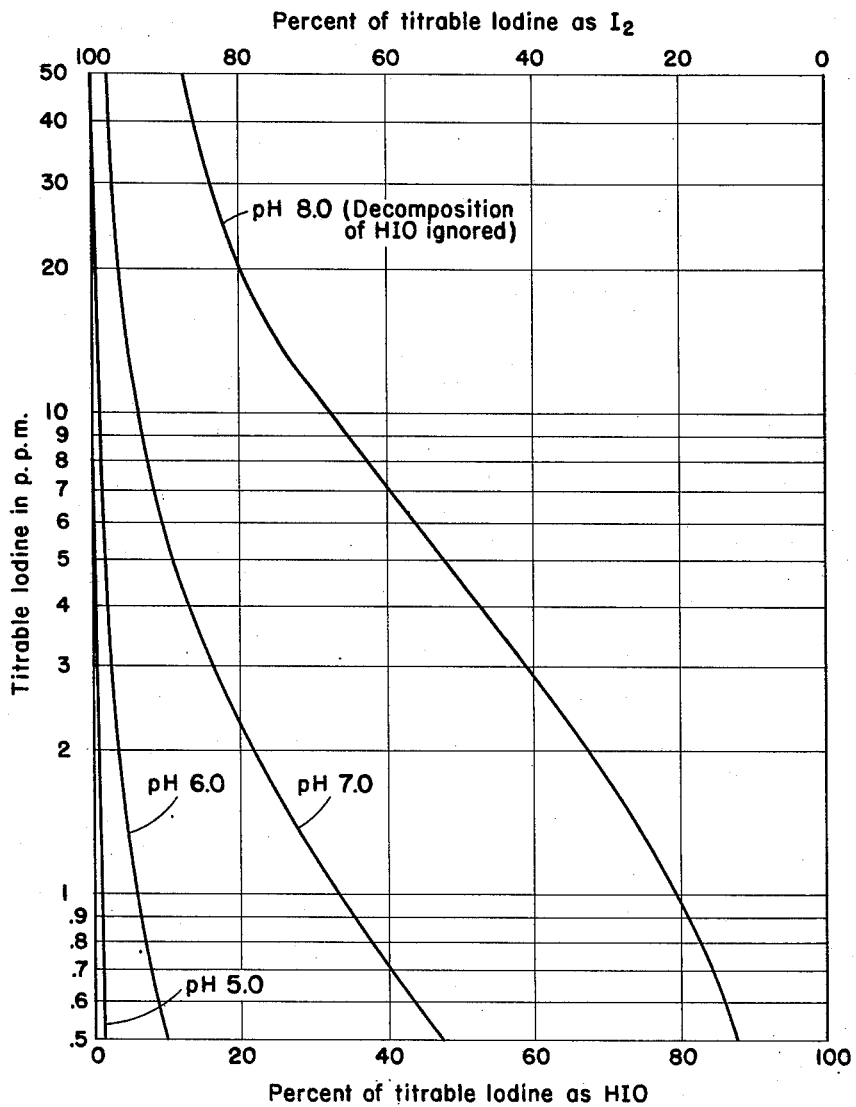
FIG. 4 is a graph showing the relation between HIO and $I_2$, as a function of total-active iodine concentration and pH.

Of course, this reaction is further aided by the presence of a fast hydrolyzing chlorine atom, with the result of a low but sustained HIO concentration, as shown by the pH 8 curve in FIG. 4.

It will be appreciated that in an acid system the dichlorodimethyl hydantoin-potassium iodide reaction will not go to completion; less than half as much hypoiodous acid is produced at pH 6.0 than at pH 7.6, and almost half of the chlorine does not react at all. Under actual conditions of use, this situation would result in a buildup of chlorine as well as an off-color pool.

It is of very substantial importance to the proper operation of the invention that both very low concentrations of iodine be used at a pH range preferably of about 7.8 to 8.2. This becomes clear by referring to FIG. 4 of the drawings which shows percent of titratable iodine as HIO percent of titratable iodine as $I_2$ and HIO in aqueous solutions at 25° C. As reference to FIG. 4 makes clear, the percent of titratable iodine as HIO goes well above 80% when the titratable iodine is in the range of 0.5 to 1.0 p.p.m. and the pH is approximately 8.0. It is to be remembered that there is no chlorine or other oxidizers available in the determinations illustrated in FIG. 4; thus, with traces of the chlorine in the water to oxidize spent iodide to iodine, pH alone will be effective to reconvert over 80% of said iodine to bactericidally active HIO when the concentrations are sufficiently low. It is this synergistic action of pH in the range of 7.8 to 8.2 coupled with low iodine concentrations and traces of chlorine which give the product of the invention its unexpected stability over much longer periods of time than were previously thought possible, i.e. regeneration of hypoiodous acid, when iodine concentrations are sufficiently low. It will also be noted in FIG. 4 that at pH 5 substantially none of the $I_2$ is converted to HIO and this goes up to less than 50% HIO at 0.5 p.p.m. iodine at pH 7. Large-scale regeneration of HIO at low iodine concentrations can thus be seen to be very substantially a function of pH. It is to be further noted that at pH values over 8.2 the HIO formed from hydrolysis of $I_2$ is unstable and decomposes to form iodate and iodide according to the following reaction:

$$3HIO + 2(OH^-) = HIO_3 + 2H_2O + 2I^-$$

At pH values over 9, the HIO formed by hydrolysis of $I_2$ undergoes dissociation; for these reasons, and with reference to FIG. 4 a pH range of 7.8 to 8.2 has been determined as being optimum.

In order to chart the same reaction cycles as discussed above under conditions of the extreme dilutions which I have found to be capable of providing effective disinfecting action according the the principles of my invention, a series of actual pools were treated with potassium iodide and dichlorodimethyl hydantoin. The graphs of FIGS. 2 and 3 show the plots for the life of the active iodine at various temperatures and concentrations in these tests. In this work, it was determined that approximately eighty percent (80%) of the available iodine was converted to hypoiodous acid; the remainder existing as diatomic iodine. The relative inefficiency of maintaining higher concentrations of iodine than approximately 1.0 part per million has been established, in that at approximately 1.2 parts per million iodine the rate of loss of iodine begins to increase sharply. On the other hand, a minimum residual or average concentration of the order of 0.1 to 0.3 part per million is necessary in order to insure sustained disinfecting action over a twenty-four (24) hour period, i.e. the usual cycle elapsing before the pool is retreated.

As has been noted hereinabove, the pH of the system will affect the ratio of $I_2$ to HIO; thus, FIGS. 2 and 3 are applicable to any system, but in the higher pH range, a higher proportion of colorless, more-active HIO is present.

The plot illustrated in FIG. 5 of the drawings shows quite graphically the manner in which the principles of the invention are applied to avoid discoloration of a pool by reason of an excess therein of diatomic iodine, while insuring the sustained presence over approximately a twenty-four (24) hour period of sufficient hypoiodous acid to provide good disinfecting properties. In the latter connection, it is found in actual practice that the presence of as little as 0.05 to 0.1 part per million of hypoiodous acid is effective for maintaining the water at drinking purity.

It is of interest to compare FIGURES 4 and 5, in that it is readily seen therefrom that at low iodine concentrations and pH around 8, conditions are optimum for maintenance of maximum HIO and minimum discoloration, the threshold of which, as can be seen from FIGURE 5, is about 0.2 p.p.m. of $I_2$.

On the basis of the foregoing, the following essential control factors can be enumerated for use in the practice of the invention:

(a) The molar ratios of available chlorine to iodine should be set at values within the range of from 2 to 1 to 6 to 1, and preferably at 3 to 1;

(b) The pH of the system should be established between pH 6.8–8.2, and preferably at pH 7.8 to pH 8.2; and (c) The iodine levels should be maintained between 0.1 to 1.0 part per million to secure sustained disinfecting action over a period of twenty-four hours.

It is interesting to note that the addition of potassium iodide, for example, to a system having a constant concentration of titratable iodine results in a greatly increased optical density at wavelengths of importance from the standpoint of pool appearance and clarity. Thus, the reaction between the potassium iodide and iodine results in the formation of the highly-colored brownish-yellow triiodide ion, as represented by the reaction:

(7) $\quad KI + I_2 = KI_3$

Conversely, the addition of available chlorine to a system with a constant concentration of titratable iodine results in a decrease of optical density through the conversion of the iodine to the highly active yet substantially colorless hypoiodous acid; as represented by the equation:

(8) $Cl^- + I_2 = HIO + Cl^-$

As indicated hereinbefore, other chlorine-releasing agents have been found to provide satisfactory results when employed in the practice of the invention. In this connection, however, it should be noted that although the relatively fast-acting readily soluble inorganics, such as calcium and sodium hypochlorite, react with the iodides to produce hypoiodous acid under the conditions enumerated hereinbefore, their hyperactivity tends to result in larger iodate formations that are necessary. In addition, the reaction products left in solution from use of these types of chlorine-donors are not entirely desirable, affecting the clarity of the water as well as the pH value.

On the other hand, the more soluble organics, such as chloramine-T, chloramine-B, sodium dichloroisocyanurate, succinchloramide, and certain salts of dichloroisocyanuric acid and trichloroisocyanuric acid, etc., like the hypochlorites, react readily to form hypoiodous acid within the desired pH range and molar ratios indicated, but they do, however, cause unwanted high local concentrations of chlorine which result, in turn, in an inordinate loss of iodine to iodate formation. This tendency can be greatly minimized by reducing the solubility of these agents, such as by tabletting, pelletizing, coating, etc., or by resorting to any of the known techniques for providing the desired chlorine concentration in a slow and continuous manner. For example, the thorough broadcasting or uniform distribution of the agents over the entire pool area, though tedious, will tend to mitigate against the formation of excessive local concentrations of chlorine when using chlorine-donors of this type.

Another effective method for reducing iodate formations when using such chlorine-donors is to reduce the molar ratio of chlorine to iodide. Thus, as a general rule it may be stated that the more active and soluble the chlorinating agent, the closer the molar ratio will approach the stoichiometric requirement for hypoiodous acid production of 2 to 1. Those salts which are less readily soluble than the above-indicated compounds are more readily adapted for use in the practice of the invention for, under conditions of their use, on achieves slow chlorine-release into the pool and uniform distribution of the same by the circulating system which results, in turn, in minimal iodine losses through iodate formation. Thus, having both relatively fast- and slow-hydrolyzing chlorine agents such as dichlorodimethyl hydantoin, halazone and trichloromelamine are the chlorine-donors of choice for use in the invention.

In the actual practice of the invention, I find it convenient to add to the pool on the initial day of treatment, the full iodide concentration necessary to achieve the desired molar ratio of available chlorine to iodide, and then add one-third of this amount each subsequent day to provide make-up iodine for iodate losses and handling and atmospheric losses. The corresponding molar proportion of the chlorine donor is then added to the pool on a daily basis. It is found that these additions can be effected directly through the distribution system of the pool, or, simple broadcasting of the material will provide a uniform distribution in a very short period of time. During such sustained treatment of the pool, it is found that relatively little variation in the pH value of the water will occur from day-to-day as a result of the treatment or other factors, and periodic pH determinations can be made to insure that the pH is maintained at the optimum level for high-yields of hypoiodous acid. Any base or acid adjustments necessary to re-establish the optimum pH can be effected through use of conventional addition agents.

It is believed that my invention may be best understood by reference to the following specific examples illustrating the application of the foregoing principles and procedures in the purification of typical swimming pool waters:

EXAMPLE I

A swimming pool of 20,000 gallons capacity was adjusted to a pH value within the range of from pH 7.8 to 8.2 at an average temperature of 74–80° F. Thereafter, potassium iodide, in amount of 60 grams, was added to the pool and permitted to become fairly uniformly distributed throughout the water by leaving the distribution system running for about 2 hours. Dichlorodimethyl hydantoin, in amount of 60 grams, was then added to the pool water. The proportions of potassium iodide and dichlorodimethyl hydantoin were selected to provide a molar ratio of available chlorine to iodine of 3 to 1. It was found that the iodine content of the pool as combined $I_2$ and HIO was quickly established at 0.6 part per million, and this level was sustained above 0.1 part per million throughout the initial twenty-four hour period following treatment.

Thereafter, for a two week period (15 days), at approximately twenty-four hour intervals, 20 grams of potassium iodide was added to the pool water each day, followed by the addition of 60 grams of dichlorodimethyl hydantoin.

Throughout the period of treatment, the water remained a beautiful sky-blue shade, and no appreciable build-up of algae was encountered. At approximately the one-week mark in the treatment cycle, an adjustment of the pH level was made by the slight addition of sodium bisulfate.

The bacterial count for the water as determined by daily testing demonstrated that a purity comparable to drinking water was sustained throughout the treatment cycle. During the test period, the pool was in actual use on an average of four (4) hours per day at a bather load of avarage value for the capacity indicated.

EXAMPLE II

The same pool as described in the previous example was exhausted of residual iodide and iodine, adjusted slightly to achieve the same pH range, and then placed on a treatment cycle involving the initial addition of about 54 grams of sodium iodide and 60 grams of dichlorodimethyl hydantoin (3 to 1 molar ratio). Each day thereafter, 18 grams of sodium iodide and 60 grams of the chlorine donor were added to the pool. The treatment was continued for a two-week period, and the same desirable results as described in connection with the purification procedure of Example I were observed throughout this period.

EXAMPLE III

The purification cycle of Example I was repeated with the initial addition of 48 grams of lithium iodide and 60 grams of dichlorodimethyl hydantoin, followed by the daily addition of 16 grams of lithium iodide and 60 grams of dichlorodimethyl hydantoin. This treatment was continued for about two weeks and the same desirable properties for the pool water as described in Example I were observed throughout the treatment cycle. It was found, however, that pH adjustment of the water became necessary at three different intervals during this period. In each instance the adjustment required was effected by the addition of sodium bisulfate.

Of course, any reasonably soluble iodide may be used to practice the invention; differences in solubility must merely be made up by adding more of the iodide.

EXAMPLE IV

In order to test the relative effectiveness of various chlorine-donors in conjunction with the principles of the invention, a 20,000 gallon pool was placed on separate cycles of five (5) days' duration each, utilizing potassium iodide and nine (9) different chlorine-donors. In all instances, the pH level of the pool was initiated at pH 7.2 to 8.2 at 74–80° F., and the additions were effected at concentrations sufficient to establish a molar ratio of available chlorine to iodide of about 3 to 1. The following tabulated data show the chlorine-donors and the amounts of each employed in these tests:

*Table I*

| Chlorine-donor | Weight addition, first day, grams | Weight addition, 2–5th days | KI-weight addition, 1st day, grams | KI-weight addition, 2–5th days, grams |
|---|---|---|---|---|
| Sodium dichloroisocyanurate | 59 | Same | 60 | 20 |
| Chloramine-T | 150 | ---do--- | 60 | 20 |
| Trichloromelamine | 41 | ---do--- | 60 | 20 |
| Dichloroisocyanuric acid | 53 | ---do--- | 60 | 20 |
| Trichloroisocyanuric acid | 41 | ---do--- | 60 | 20 |
| Chloramine-B | 132 | ---do--- | 60 | 20 |
| Calcium hypochlorite | 54 | ---do--- | 60 | 20 |
| Sodium hypochlorite | ¹ 376 | ---do--- | 60 | 20 |
| Chlorine gas (fed into the pool as rapidly as possible) | 19 | ---do--- | 60 | 20 |

¹ ⁴/₁₀ quart.

While the tests demonstrated the effectiveness of the above-listed materials to establish purifying levels of hypoiodous acid within the waters undergoing treatment, the limitations and precautions noted hereinbefore with respect to certain of these chlorine-donors, namely, the occurrence of localized concentrations of excess chlorine and undue exhaustion of iodine through iodate formation, were also obvious. The corrective measures to be employed in conjunction with use of these materials as also noted hereinbefore will serve to prevent this type of difficulty in any sustained treatment cycles involving use of the same.

EXAMPLE V

Three outdoor swimming pools at the men's gymnasium of a Western university were used for a complete test of the process and material of the invention. These pools consist of a racing pool of 135,000 gallons capacity, a class instruction pool of 60,000 gallons capacity, and a diving pool of 190,000 gallons capacity. The subjects of the test were 30 young male students who were members of the freshmen and varsity swimming teams and of a swimming class. Twenty members of the swimming teams used the pools for from one to three hours per day, five times a week. Ten swimming class members used the pool for approximately forty minutes per day three times a week.

After removing all chlorine from the pool, the pools were treated in accordance with the invention so as to maintain approximately 0.7 to 0.8 p.p.m. of combined $I_2$ and HIO in the pool at a pH of from 7.9 to 8.1. The pools were tested on an average of four times daily with the Iode-type pool test kit and the Taylor pool test kit for combined $I_2$ and HIO levels and for pH determinations respectively.

In addition to the foregoing tests and additional tests for bacteriological activity in the treated pools the aforementioned group of thirty male college swimmers were tested for possible blood and urinary changes in protein bound iodine (PBI) and total iodine respectively, after exposures of one day, one week, and one month in the swimming pools treated by the product of the invention. The purpose of the study was to reveal any potentially harmful inhalation, ingestion, or absorption of iodine on the part of the swimmers.

The normal PBI is considered to range from 4.0 to 8.0 micrograms percent, with a mean of 5.3 micrograms percent, and all conclusions regarding the findings of this study were made with these standards in mind. Results of the test showed that there was no effect on the PBI level of the blood due to swimming in the pools treated according to the invention. The base line group average was 4.7 micrograms percent and the one month's termination average was 4.9, i.e. virtually identical, and the intervening group averages were likewise within the normal range of 4.0 to 8.0 micrograms percent.

With respect to the urinary total iodine determinations, the average base line determination was 71 micrograms percent for the thirty subjects. After an exposure of one month the average determination for the group was 74 micrograms percent, an inconsequential change. Intervening averages reflected, if anything, a lowering of the iodine intake, although the changes appear insignificant.

During the first three days of the test, the pool operator was in the process of adjusting iodine residual contents and this was complicated by storm conditions, including rain and wind, which were sufficiently severe to give an unsatisfactory bacteriological result from the pools. But in the succeeding 66 consecutive determinations, the bacteriological counts exceeded the State Department of Public Health standards only once. There was no evidence of any growth of fungus or algae during the month of the research although no algaecide was in use during the time. A summary of the plate counts and E. Coli determinations, together with the combined $I_2$ and HIO concentration, pH, and pool conditions for seven days spanning the month of the test is given in the appended table.

*Table II*

| Day of Sample | $I_2$ and HIO | pH | Pool | | | | | | Conditions |
| | | | Varsity | | Diving | | Class | | |
| | | | Count | E. coli | Count | E. coli | Count | E. coli | |
|---|---|---|---|---|---|---|---|---|---|
| Feb. 1, 1962 | 0.8 | 7.9 | 7,000 | 0 | 1,400 | 0 | 1,200 | 0 | Raining—Few leaves on bottom. |
| Feb. 9, 1962 | 0.6 | 7.9 | 8 | 0 | 2 | 0 | 30 | 0 | Cloudy. |
| Feb. 14, 1962 | 0.7 | 7.9 | 15 | 0 | 30 | 0 | 30 | 0 | Windy—Some dust in pool. |
| Feb. 15, 1962 | 0.8 | 7.9 | 20 | 0 | 10 | 0 | 20 | 0 | Sunny. |
| Feb. 16, 1962 | 0.7 | 7.9 | 45 | 0 | 200 | 0 | 25 | 0 | Raining. |
| March 17, 1962 | 0.7 | 7.9 | 90 | 0 | 30 | 0 | 30 | 0 | Do. |
| March 21, 1962 | 0.8 | 8.0 | 90 | 0 | 30 | 0 | 90 | 0 | Windy—Material from pine trees in pools. |
| March 22, 1962 | 0.8 | 8.0 | 10 | 0 | 9 | 0 | 13 | 0 | Raining. |
| March 23, 1962 | 0.8 | 8.0 | 25 | 0 | 22 | 0 | 70 | 0 | Clear. |

In addition to the foregoing, medical observations were made on 28 of the subjects participating in the study for one month as to any evidence of conjunctivitis or other eye irritation. These observations were made by licensed physicians who made independent examinations of each eye of each swimmer. The results of these examinations show that 27 of the swimmers examined received a complete negative rating for eye irritation. In only one student was a mild conjunctivitis found on medical examination; this student wears contact lenses and stated that his eye irritation "had improved in a miraculous way" since the pool has been treated wtih the product of the invention. It was concluded by the investigators that the product of the invention when properly applied in a swimming pool is superior to chlorine so far as eye irritation is concerned.

It will be understood that various changes in the details, materials, steps and procedures, which have been herein described and illustrated in order to explain the nature of the invention, may be made by those skilled in the art within the principle and scope of the invention as expressed in the appended claims.

This application constitutes a continuation-in-part replacement of prior copending application Serial No. 38,787, filed June 27, 1960, now abandoned.

Having thus described the subject matter of my invention, what it is desired to secure by Letters Patent is:

1. Process for the sustained purification of aqueous media that comprises establishing said media at a pH value within the range of from pH 6.8 to 8.2 and introducing therein water-soluble iodide and a substance having at least one readily available hydrolyzable chlorine atom in respective amounts sufficient to provide a molar ratio of available chlorine to iodine within said media within the range of from 2 to 1 to 6 to 1, the concentration of said iodide with respect to the volume of the aqueous media being sufficient to provide from about 0.1 to 1.0 part per million of total bactericidal iodine therein.

2. Continuous process for the sustained purification of aqueous media that comprises establishing said media at a pH value of from 7.2 to 8.2 and introducing therein initial quantities of a water-soluble iodide and a substance having at least one readily available hydrolyzable chlorine atom in respective amounts sufficient to provide a molar ratio of available chlorine to iodine within said media of from 2 to 1 to 6 to 1, the concentration of said iodide with respect to the volume of the aqueous media being sufficient to provide from about 0.1 to 1.0 part per million of total bactericidal iodine therein in the form of diatomic iodine and hypoiodous acid, periodically replenishing the concentration of iodide within the aqueous media by the addition thereto of iodide in an amount substantially equivalent to the available iodine lost by conversion to iodate and handling atmospheric and physical losses, and adding additional quantities of said chlorine-yielding substance to the aqueous media on a periodic basis to reestablish said molar ratio of available chlorine to iodine.

3. Process for the sustained purification of aqueous media that comprises establishing said media at a pH value of from pH 7.2 to 8.2 and introducing therein water-soluble iodide and a substance having at least one readily available hydrolyzable chlorine atom in respective amounts sufficient to provide a molar ratio of available chlorine to iodine within said media of about 3 to 1, the concentration of said iodide with respect to the volume of the aqueous media being sufficient to provide from about 0.1 to 1.0 part per million of total bactericidal iodine therein in the form of diatomic iodine and hypoiodous acid.

4. Process for the purification of aqueous media for at least twenty-four hours that comprises establishing said media at a pH value of from pH 7.8 to 8.2 and introducing therein water-soluble iodide and a substance having at least one readily available hydrolyzable chlorine atom in respective amounts sufficient to provide a molar ratio of available chlorine to iodine within said media of about 3 to 1, the concentration of said iodide with respect to the volume of the aqueous media being sufficient to provide from about 0.1 to 1.0 part per million of total bactericidal iodine therein in the form of diatomic iodine and hypoidous acid.

5. In the disinfection and purification of swimming pool water, the improvement that comprises establishing and maintaining on a daily basis within said water approximately 0.1 to 1.0 part per million of hypoiodous acid and diatomic iodine by the addition thereto of controlled quantities of potassium iodide and dichlorodimethyl hydantoin, whereby said disinfection and purification is sustained for at least twenty-four hours.

6. Process for effecting combined bactericidal and algaecidal control of swimming pool water on a sustained basis that comprises treating said water on a daily basis with hypoiodous acid and a diatomic iodine at a concentration of approximately 0.1 to 1.0 part per million.

7. Material for introduction into water for bactericidal control of the same that comprises, water-soluble iodide for reaction with available chlorine in solution to liberate bactericidal iodine, and a chlorine-yielding substance selected from the group consisting of dichlorodimethyl hydantoin, trichloromelamine, and halazone, said iodide and chlorine yielding substance being present in respective proportions to provide a molar ratio of available chlorine to iodine of about 3 to 1.

8. In the disinfection and purification of swimming pool water, the improvement that comprises establishing and maintaining on a daily basis within said water approximately 0.1 to 1.0 part per million of hypoiodous acid and diatomic iodine by the addition thereto of a water-soluble iodide and at least one chlorine-yielding substance selected from the group consisting of dichlorodimethyl hydantoin, trichloromelamine, halazone, sodium dichloroisocyanurate, chloramine-T, chloramine-B, dichloroisocyanuric acid, trichloroisocyanuric acid, calcium hypochlorite, sodium hypochlorite and chlorine gas, said chlorine-yielding substance being added in an amount sufficient to provide a molar ratio of available chlorine to iodine within said water of from 2 to 1 to 6 to 1, and maintaining said water at a pH between approximately 7.2 and 8.2.

9. Process for sustained purification of aqueous media that comprises,
establishing said media at a pH of from 7.2 to 8.2,
introducing therein a water-soluble iodide;
Introducing therein a substance having at least one rapidly-reactive chlorine atom and one relatively slowly reactive chlorine atom in an amount sufficient to provide a molar ratio of initially available chlorine to iodine within said media of from 2 to 1 to 6 to 1, said rapidly-reactive chlorine atom acting to oxidize iodide to bactericidally active hypoiodous acid and said slowly reactive chlorine atom being effective to oxidize spent iodine (iodide) to diatomic iodine, hydrolysis within said pH range being effective to reconvert a substantial portion of said diatomic iodine to said hypoiodous acid, the concentration of said initially introduced iodide with respect to the volume of the aqueous media being sufficient to provide from about 0.1 to 1.0 part per million of total bactericidal iodine therein in the form of iodine and hypoiodous acid.

10. Process for the sustained purification of aqueous media that comprises,
establishing said media at a pH of from 7.8 to 8.2,
introducing therein a water-soluble iodide;
introducing therein a substance having at least one rapidly-reactive chlorine atom and one relatively slowly reactive chlorine atom in an amount sufficient to provide a molar ratio of initially available chlorine to iodine within said media of from about 3 to 1, said rapidly-reactive chlorine atom acting to oxidize iodide to bactericidally active hypoiodus acid and said slowly reactive chlorine atom being effective to oxidize spent iodine (iodide) to diatomic iodine, hydrolysis within said pH range being effective to reconvert a substantial portion of said diatomic iodine to said hypoiodous acid, the concentration of said initially introduced iodide with respect to the volume of the aqueous media being sufficient to provide from about 0.1 to 1.0 part per million of total bactericidal iodine therein in the form of iodine and hypoiodous acid.

11. The process as claimed in claim 10, wherein said process is carried out on a continuous basis by once-daily treatment of said aqueous media.

References Cited in the file of this patent

UNITED STATES PATENTS 2,817,621    Marks et al.             Dec. 24, 1957
2,904,470    Berliner et al.           Sept. 15, 1959

OTHER REFERENCES

Allawala et al.: J. A. Ph-Association (scientific ed.), vol. XLII: 7, July 1953, 167–70.